3,352,907
PRODUCTION OF MUCOCHLORIC ACID
Franz Reicheneder and Karl Dury, Ludwigshafen (Rhine), Germany, assignors to Badische Anilin- & Soda-Fabrik Aktiengesellschaft, Ludwigshafen (Rhine), Germany
No Drawing. Filed Dec. 4, 1964, Ser. No. 419,163
Claims priority, application Germany, Dec. 7, 1963, B 74,587
9 Claims. (Cl. 260—539)

This invention relates to a process for the production of mucochloric acid.

We have found that mucochloric acid is obtained by reacting with chlorine a compound free from carbon-carbon triple bonds and containing four carbon atoms in direct sequence without branching, the two outer carbon atoms of the said four carbon atoms being either each substituted at least once or combined with each other via at least one hetero atom to form a heterocyclic ring, and at least one of the said outer carbon atoms bearing at least one hydrogen atom.

Both chain and cyclic compounds are suitable as initial materials for the new process provided they have not more and not less than four carbon atoms attached to one another in linear arrangement and provided either (a) the two outer carbon atoms (in the case of a chain compound) are substituted at least once or (b) at least one heteroatom is contained as a member of a heterocyclic ring containing the said four carbon atoms. The carbon atoms may be joined to each other by single bonds or also by one or two double bonds, but should not be joined by triple bonds. Examples of substituents of the outer carbon atoms are halogen atoms, hydroxyl groups, ether groups, doubly bonded oxygen atoms (as in a formyl group), doubly bonded oxygen atoms together with hydroxy or alkoxy with 1 to 4 carbon atoms (as in carboxylic or carbalkoxy groups), triple bond nitrogen (as in the nitrile group), amino groups and substituted amino groups. Examples of substituents in amino groups are alkyl, aryl or cycloalkyl having up to eight carbon atoms, or heterocyclic groups. The said heterocyclic compounds contain one oxygen or sulfur atom or one nitrogen atom in an imino group which may bear alkyl having one to four carbon atoms. The heteroatoms may bear further heteroatoms as substituents, as for example in the case of sulfur bearing one or two oxygen atoms as substituents. The new process may also be used on chain compounds of the said type in which the hydrogen atoms of the middle two of the four consecutive carbon atoms are wholly or partly replaced by substituents, such as chlorine atoms or doubly bonded oxygen atoms. In the case of cyclic compounds, the same is true not only for the middle two but also for the outer carbon atoms of the four consecutive carbon atoms. Chain and cyclic compounds having four to eight carbon atoms without double bonds are particularly suitable for the process and, among these, those which contain only oxygen atoms as heteroatoms. Compounds of the type suitable for the new process are particularly: butanediol-(1,4), chlorobutanediols-(1,4), as for example 2,3-dichlorobutanediol-(1,4), butenediol-(1,4), γ-chlorobutyronitrile, γ-hydroxybutyric acid, succinic dialdehyde, β-formylpropionic acid ethyl ester, and also cyclic compounds without double bonds or with one or two double bonds, such as furan, 2,5-dihydrofuran, tetrahydrofuran, α-chlorotetrahydrofuran, pyrrole, pyrrolidine, N-ethylpyrrolidine, pyrrolidone, N-methylpyrrolidone and other N-alkylpyrrolidones, butyrolactone and 4,5-dihydro-1,2-diazine.

The possibility, offered by the new process, of using many compounds as initial materials for the production of mucochloric acid which could not hitherto be used for this purpose, represents a substantial contribution to the art. Moreover, the fact that this important compound can be obtained, not only as hitherto by chlorination of a compound containing a triple bond, such as butynediol-(1,4), but also from compounds containing only one or two double bonds or even from saturated $C_4$-compounds, is very surprising. For, contrasted with the reaction with the said acetylene derivative, the reaction which occurs with the compounds containing double bonds is not the expected addition of chlorine to the unsaturated compounds, but a substitution otherwise achieved only at elevated temperatures (apart from the case when chlorine atoms are already present), while in the case of the saturated compounds, a double bond is also freshly formed between the two middle carbon atoms of the four consecutive carbon atoms.

The new process is preferably carried out in the presence of water, for example by introducing chlorine into aqueous neutral or acid-containing solutions or mixtures of the initial materials. A particularly advantageous embodiment consists in preheating the solutions to the desired temperature and saturating them with chlorine prior to the introduction of the initial material. The initial material may be added in solid or liquid (molten) form or advantageously in solution, particularly in aqueous solution, either continuously or intermittently. When acids are used, mineral acids are particularly suitable, such as hydrochloric acid, sulfuric acid, phosphoric acid or nitric acid; these may be used up to high concentrations, as for example 36% in the case of hydrochloric acid.

The chlorine is preferably passed as a gas into the reaction mixture. The amount thereof may vary within wide limits; it is particularly advantageous to use the chlorine in more than the equivalent amount, especially in molar ratios of 2:1 to about 20:1, with reference to the initial material. The process may however be used with amounts of chlorine which are less than the equivalent amount. It is also possible to add the chlorine intermittently.

The process may often be carried out at atmospheric pressure, but superatmospheric or subatmospheric pressures, particularly in a pressure range of from about 0.5 to about 5 atmospheres, may be used. The temperatures may also vary within wide limits; the range of from 30° to 130° C., particularly from 60° to 110° C., is preferred.

Conventional chlorination catalysts may naturally be coemployed if desired. Examples of such catalysts are light having a wavelength of preferably abost 250 to 700 millimicrons, and free radical forming substances, such as hydrogen peroxide and benzoyl peroxide. Alkali metal or alkaline earth metal salts, for example, the chlorides, chlorates, sulfates, nitrites or nitrates of sodium, potassium, lithium, ammonium, magnesium, calcium, strontium or barium, and also heavy metal compounds, such as iron, zinc, mercury, nickel, lead or bismuth oxides or salts, for example salts of inorganic or organic acids or enolates, are also suitable. Examples of preferred heavy metal compounds are zinc chloride, mercury chloride, iron(II) sulfate, iron(III) chloride, vanadium pentoxide and nickel acetylacetonate. These catalysts may be used in small amounts, for example from 0.1 to 2% by weight, with reference to the final volume.

The process may also be carried out continuously without difficulty. Chlorine may be passed cocurrent or countercurrent to the solution and operation may be by the liquid phase process or trickling process.

The mucochloric acid thus prepared may be recovered from the reaction mixture by conventional methods, for example by extraction with ether. It may also be obtained particularly advantageously, for example by cooling the mixture, if desired after it has previously been concentrated, and by subsequent filtration or centrifuging of the deposited crystals.

Mucochloric acid may be used in many ways as a biocide, for example as a nematocide, as an insecticide or insect repellent or as a herbicide. It is also suitable for flameproofing plastics. Moreover, it may be used as a reactive intermediate for the production of many other compounds.

The invention is further illustrated by the following examples. The parts specified in the examples are parts by weight unless otherwise stated. Parts by volume bear the same relation to parts by weight as the liter (S.T.P.) to the kilogram.

EXAMPLE 1

A stream of chlorine of 75 parts by volume per hour is passed at a maximum temperature of about 30° C. into a mixture of 255 parts of butanediol-(1,4) and 250 parts of water in a chlorination apparatus fitted with an internal circulation tube. The temperature is raised to 97° to 100° C. three hours later and at the same time the stream of chlorine is intensified to 110 parts by volume per hour and the reaction mixture is exposed to an incandescent lamp of 500 watts. Four hours later the chlorination is stopped and the mixture obtained is cooled overnight in a refrigerator. 88 parts of mucochloric acid is obtained which in its crude condition melts at 122° to 124° C.

EXAMPLE 2

Chlorination is carried out under the same conditions as in Example 1 except that the initial material is 200 parts of tetrahydrofuran. 76 parts of mucochloric acid is obtained after cooling.

EXAMPLE 3

173 parts of butyrolactone is allowed to flow during the course of seven hours at 95° to 100° C. into 1000 parts of 2 N sulfuric acid in an apparatus of the design specified in Example 1, the volume of the mixture being kept constant by distilling off water. Then chlorine is passed in for another half hour. The solution is cooled and 52 parts of mucochloric acid may be recovered from the solution. Its melting point, without recrystallization, is 120° to 122° C.

If the filtrate from the mucochloric acid thus obtained be reacted again in the same way with 172 parts of butyrolactone and chlorine, a yield of 194 parts of mucochloric acid is obtained and, by another repetition, even a yield of 214 parts of mucochloric acid having the melting point 120° to 122° C. may be obtained.

EXAMPLE 4

170 parts of pyrrolidone is reacted for seven hours under the conditions specified in Example 3. The reaction mixture is then cooled. 69 parts of mucochloric acid having a melting point of 124° C. is obtained by extraction with ether and concentration of the ethereal solution.

EXAMPLE 5

100 parts by volume of furan is allowed to flow during the course of four hours into 1 part by volume of 10% hydrochloric acid at 70° C. in an apparatus of the same design as in Example 1 and at the same time 50 parts by volume of chlorine per hour is passed in. Chlorination is then continued for another hour, the solution becoming paler in color. 90 parts of mucochloric acid is obtained which, when recrystallized from water, melts at 124° C. to 125° C.

EXAMPLE 6

700 parts of 2 N sulfuric acid is heated to about 95° to 100° C. in a chlorination apparatus having an internal circulation tube, 100 parts by volume of chlorine per hour is passed in and at the same time a solution of 100 parts of 2,3-dichlorobutenediol-(1,4) in 220 parts of water is allowed to flow in. Chlorine is then passed into the solution for another two hours, after which the solution is cooled and extracted exhaustively with ether. The ethereal extract yields 70 parts of crystallized mucochloric acid.

We claim:

1. A process for the production of mucochloric acid which comprises reacting chlorine in an aqueous neutral to acid medium at about 30° to 130° C. with an organic compound selected from the class consisting of saturated and olefinically unsaturated aliphatic and heterocyclic cmpounds having exactly 4 carbon atoms connected directly to each other in an unbranched linear chain, the inner two carbon atoms of said chain being substituted solely by members selected from the group consisting of hydrogen and chlorine and the outer two carbon atoms of said chain being substituted by at least one hydrogen atom and members selected from the group consisting of oxygen, nitrogen, chlorine, hydroxy, alkoxy of 1 to 4 carbon atoms, amino, lower alkyl amino, imino and lower alkyl imino.

2. A process as claimed in claim 1 wherein the temperature is between about 60° and 110° C.

3. A process as claimed in claim 1 wherein said reaction is carried out under a pressure of about 0.5 to 5 atmospheres.

4. A process as claimed in claim 1 wherein the compound reacted with chlorine is butanediol-(1,4).

5. A process as claimed in claim 1 wherein the compound reacted with chlorine is 2,3-dichlorobutanediol-(1,4).

6. A process as claimed in claim 1 wherein the compound reacted with chlorine is butyrolactone.

7. A process as claimed in claim 1 wherein the compound reacted with chlorine is pyrrolidone.

8. A process as claimed in claim 1 wherein the compound reacted with chlorine is furan.

9. A process as claimed in claim 1 wherein the compound reacted with chlorine is tetrahydrofuran.

References Cited

UNITED STATES PATENTS 2,588,852   3/1952   Kuk _____ 260—539
2,821,553   1/1958   Dunlop _____ 260—539

LORRAINE A. WEINBERGER, Primary Examiner.

A. P. HALLUIN, Assistant Examiner.